United States Patent
Livescu et al.

(10) Patent No.: US 11,319,803 B2
(45) Date of Patent: May 3, 2022

(54) COILED TUBING ENABLED DUAL TELEMETRY SYSTEM

(71) Applicant: Baker Hughes Holdings LLC, Houston, TX (US)

(72) Inventors: Silviu Livescu, Calgary (CA); Bennie J. Lindsey, Calgary (CA); Bryan Blomquist, Calgary (CA)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 0 days.

(21) Appl. No.: 17/004,408

(22) Filed: Aug. 27, 2020

(65) Prior Publication Data

US 2020/0392838 A1 Dec. 17, 2020

Related U.S. Application Data

(63) Continuation-in-part of application No. 16/344,210, filed on Apr. 23, 2019, now Pat. No. 10,844,707.

(51) Int. Cl.

| | |
|---|---|
| *E21B 47/12* | (2012.01) |
| *E21B 47/135* | (2012.01) |
| *G01D 5/26* | (2006.01) |
| *E21B 17/00* | (2006.01) |
| *G01V 1/22* | (2006.01) |
| *E21B 47/07* | (2012.01) |
| *G01K 11/3206* | (2021.01) |

(52) U.S. Cl.
CPC ............ *E21B 47/12* (2013.01); *E21B 17/003* (2013.01); *E21B 47/07* (2020.05); *E21B 47/135* (2020.05); *G01D 5/268* (2013.01); *G01K 11/3206* (2013.01); *G01V 1/226* (2013.01)

(58) Field of Classification Search
CPC ...... E21B 47/12; E21B 17/203; E21B 17/206; E21B 47/135; E21B 47/07; E21B 17/028; G01D 5/268; G01V 1/226; G01K 11/3206
See application file for complete search history.

(56) References Cited

U.S. PATENT DOCUMENTS

| | | | |
|---|---|---|---|
| 5,316,950 A * | 5/1994 | Apitz .................. | G01N 21/274 422/82.07 |
| 5,495,547 A | 2/1996 | Rafie et al. | |
| 6,116,085 A * | 9/2000 | Moffatt ................ | E21B 17/206 166/250.01 |
| 9,828,819 B2 * | 11/2017 | Bujold ................... | E21B 47/01 |

(Continued)

FOREIGN PATENT DOCUMENTS

| | | |
|---|---|---|
| WO | 2010144160 A1 | 12/2010 |
| WO | 2016100271 A1 | 6/2016 |

OTHER PUBLICATIONS

International Preliminary Report on Patentability for International Application No. PCT/US2016/060998; International Filing Date Nov. 8, 2016; dated May 23, 2019 (pp. 1-9).

(Continued)

*Primary Examiner* — Brad Harcourt
(74) *Attorney, Agent, or Firm* — Cantor Colburn LLP

(57) ABSTRACT

A telemetry system is provided for a coiled tubing-based work string and includes electrical transmission of power and data between sensors in a bottom hole assembly and a controller. One or more optic fibers are used to provide distributed temperature or acoustic sensing along the length of the work string.

18 Claims, 2 Drawing Sheets

(56) References Cited

U.S. PATENT DOCUMENTS

| | | |
|---|---|---|
| 2005/0034857 A1 | 2/2005 | Defretin et al. |
| 2005/0263281 A1 | 12/2005 | Lovell et al. |
| 2012/0013893 A1 | 1/2012 | Maida et al. |
| 2012/0085531 A1 | 4/2012 | Leising et al. |
| 2014/0231066 A1* | 8/2014 | McColpin ............... E21B 47/06 166/66 |
| 2016/0146662 A1 | 5/2016 | Stokely et al. |
| 2017/0096892 A1 | 4/2017 | Segura Dominguez |
| 2018/0266238 A1 | 9/2018 | Livescu et al. |
| 2019/0257194 A1 | 8/2019 | Garner et al. |

OTHER PUBLICATIONS

International Search Report and Written Opinion for International Application No. PCT/US2016/060998; International Filing Date Nov. 8, 2016; dated Aug. 9, 2017 (pp. 1-12).

International Search Report and Written Opinion for International Application No. PCT/US2021/047038; International Filing Date Aug. 23, 2021; dated Dec. 6, 2021 (pp. 1-11).

* cited by examiner

COILED TUBING ENABLED DUAL TELEMETRY SYSTEM

BACKGROUND OF THE INVENTION

1. Field of the Invention

The invention relates generally to devices and methods for transmitting power and data through a coiled tubing string as well as systems and methods for collection of dual sources of downhole telemetry.

2. Description of the Related Art

Coiled tubing is commonly used as a running string for a wide variety of downhole tools. Coiled tubing is well known in the art and consists of a length of metallic tubing which is capable of being wound onto a coil while at surface and unspooled from the coil to be injected into a wellbore. Telecoil® is sometimes used to transmit power and data through coiled tubing. Telecoil is coiled tubing which includes tubewire within coiled tubing. Tubewire is a tube that contains an insulated cable that is used to provide electrical power and/or data to a bottom hole assembly (BHA) or to transmit data from the BHA to the surface. Tube-wire is available commercially from manufacturers such as Canada Tech Corporation of Calgary, Canada.

SUMMARY OF THE INVENTION

The invention provides systems and methods for transmitting electrical power and/or signals as well as optical signals within coiled tubing and along a wellbore. A coiled tubing system is described which includes a string of coiled tubing which defines a central flowbore along its length. The invention provides a coiled tubing-based telemetry system incorporating a hybrid cable which includes at least one electrical conduit and at least one optic fiber which permits two-way communication and two-way power transmission.

The systems and methods of the present invention are useful for communication and control for various bottom hole assemblies. When interconnected with a variety of wellbore sensors, hybrid cabling can provide real-time information to operators at surface. In described embodiments, electrical conduits transmit signals to surface in real-time and supply power to downhole sensors and/or tools. In accordance with described embodiments, the systems and methods of the present invention provide dual wellbore telemetry to surface in real-time during downhole operations. A first set of telemetry is provided via sensors within the bottom hole assembly. The sensors are preferably single point sensors. A second set of telemetry is provided via optic fiber sensing techniques, such as distributed temperature sensing (DTS).

In described embodiments, a connector is used to interconnect the coiled tubing and cabling with a bottom hole assembly. An exemplary connector is described which includes a housing with threaded connections at each axial end. The connector includes a termination for finishing the optic fiber above the bottom hole assembly while the electrical conduit passes through the connector to the bottom hole assembly below it.

In described embodiments, the telemetry system includes a bus system which allows the bottom hole assembly to be made up of a number of interchangeable modules. The bus system allows power and data to be transmitted between the modules of the bottom hole assembly. This feature allows for custom construction of a bottom hole assembly having a desired mix of sensors and/or tools.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE PREFERRED EMBODIMENTS

The invention features a telemetry system for a wellbore work string having running string and a bottom hole assembly which is secured to the running string by a connector. The telemetry system includes an optical sensing system which monitors a wellbore parameter along a length of the running string using at least one optic fiber which extends along a flowbore of the running string and which terminates within the connector. The telemetry system also includes an electrical telemetry system which includes at least one sensor within the bottom hole assembly and an electrical conductor which transmits data from the sensor to a controller.

Figure 1:
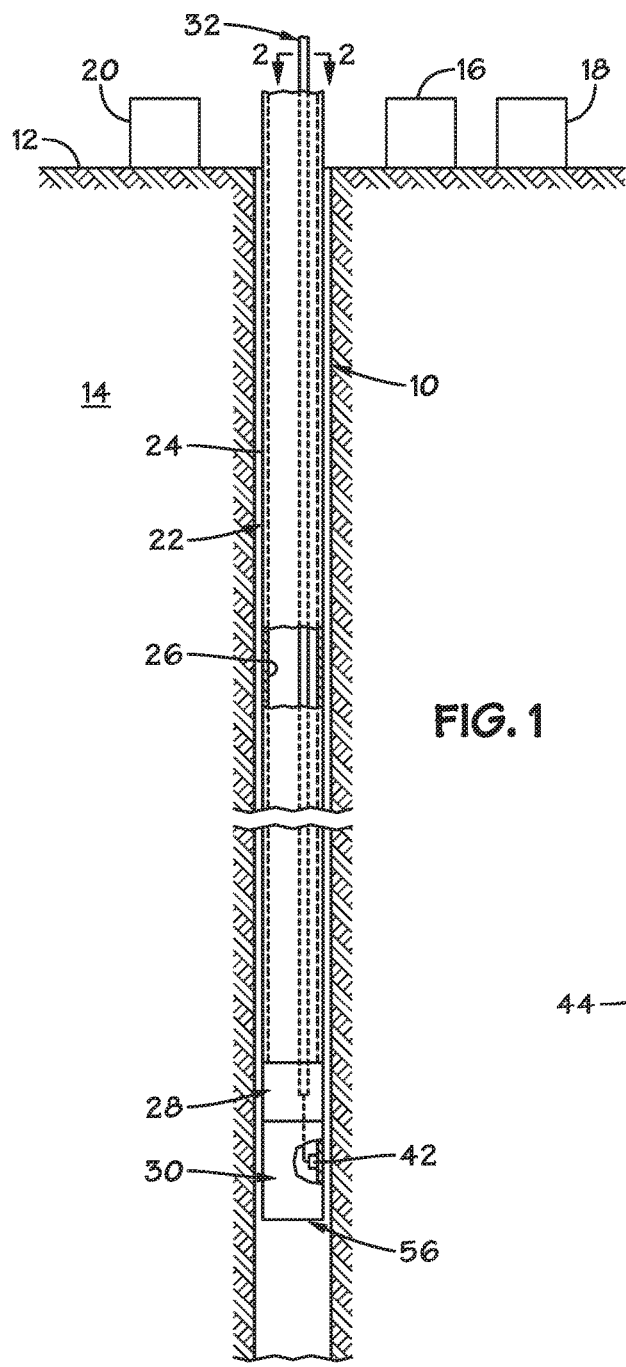
FIG. 1 is a side, cross-sectional view of an exemplary wellbore containing a bottom hole assembly and coiled tubing telemetry system constructed in accordance with the present invention.

FIG. 1 illustrates an exemplary wellbore 10 which has been drilled from the surface 12 through the earth 14. Although the depicted wellbore 10 is shown as being vertically oriented within the earth 14, it should be understood that the wellbore, or portions thereof, may be inclined or horizontal.

A coiled tubing injector (not shown) of a type known in the art is located at surface 12 and is used to inject coiled tubing into the wellbore 10. A controller 16 is also located at surface 12. The controller 16 is preferably a programmable device, such as a computer, which is capable of receiving data in the form of electrical signals from a downhole sensor arrangement for display to a user and/or for storage. Additionally, an electrical power source 18 is located at surface 12 and may be in the form of a generator or battery. The electrical power source 18 should be suitable for transmitting power downhole to a sensor or tool. Also located at surface 12 is an OTDR (optical time-domain reflectometer) 20.

A coiled tubing-based work string 22, is shown being injected into the wellbore 10. The work string includes a running string 24 made up of coiled tubing, of a type known in the art, and which defines a central flowbore 26 along its length. Generally, the work string 22 is useful for conducting one or more of several types of downhole operations within the wellbore 10, as dictated by the variety of bottom hole assembly which is installed on the work string 22. A connector 28 and a bottom hole assembly (BHA) 30 are located at the distal end of the running string 24. The bottom hole assembly 30 may be a fishing BHA, an acidizing/fracturing BHA, or a cleanout BHA. Alternatively, the bottom hole assembly 30 could be any electrically powered tool, such as an electric submersible pump, a tool for opening and closing sliding sleeves or a drilling/milling arrangement. The connector 28 connects the bottom hole assembly 30 with the running string 24.

Figure 2:
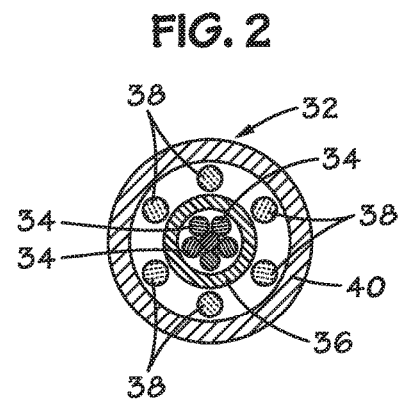
FIG. 2 is an axial cross-section of an exemplary hybrid cable in accordance with the present invention.

A hybrid cable 32 extends along the flowbore 26 of the running string 24 to the connector 28. At surface 12, elements of the hybrid cable 32 are operably associated with the controller 16, electrical power source 18 and OTDR 20. FIG. 2 illustrates an exemplary hybrid cable 32 which permits two-way data communication and two-way power through electrical conductors. The cable 32 includes a plurality of electrical conductors or wires 34 which are surrounded by a layer of insulation 36. A plurality of optic fibers 38 are located radially outside of the insulation layer 36. An outer metallic tubing 40 surrounds the optic fibers 38. The electrical conductors or wires 34 are associated at surface 12 with the electrical power source 18 to provide power to one or more sensors, such as sensor 42, or other tools of the bottom hole assembly 30. The electrical conductors or wires 34 are also interconnected with the controller 16 and can transmit data from sensor(s) 42 or other tools to the controller 16 so that a first operating parameter or first set of parameters are provided to the controller 16. The sensor(s) 42 preferably single point sensors which are capable of detecting wellbore parameters associated with the bottom hole assembly 30 and its proximate location. These parameters can include temperature, pressure, gamma, casing collar location, azimuth, tension, compression and torque.

The optic fibers 38 are interconnected at surface 12 with the OTDR 20. The optic fibers 38 will each typically include a transparent central core with outer cladding which has a lower index of refraction than that of the core. One or more of the optic fibers 38 will include a number of Bragg gratings, as known in the art, along their lengths. In accordance with preferred embodiments, the Bragg gratings are formed within the core of the optic fiber(s) 38 at spaced intervals along the length of the fiber(s) 38. The OTDR 20 is used to both generate optical pulses into the optic fiber 38 as well as receive backscattered light from the optical fiber 38.

During operation of the work string 22, the optic fibers 38 provide optical telemetry to the OTDR 20 which is indicative of at least one second operating parameter within the wellbore 10. In certain embodiments, the optic fibers 38 and OTDR 20 are configured to perform distributed temperature sensing (DTS) or distributed acoustic sensing (DAS) and provide telemetry to the OTDR 20. The optic fibers 38 and OTDR 20 can provide information regarding sensed temperature or acoustics along the length of the optic fiber 38.

Figure 3:
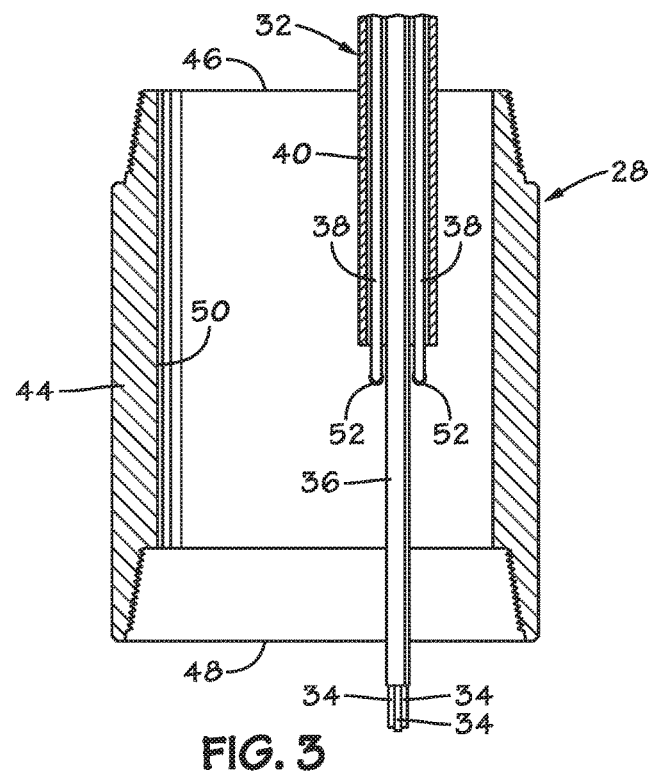
FIG. 3 is a side, cross-sectional view of an exemplary connector in accordance with the present invention.
Figure 4:
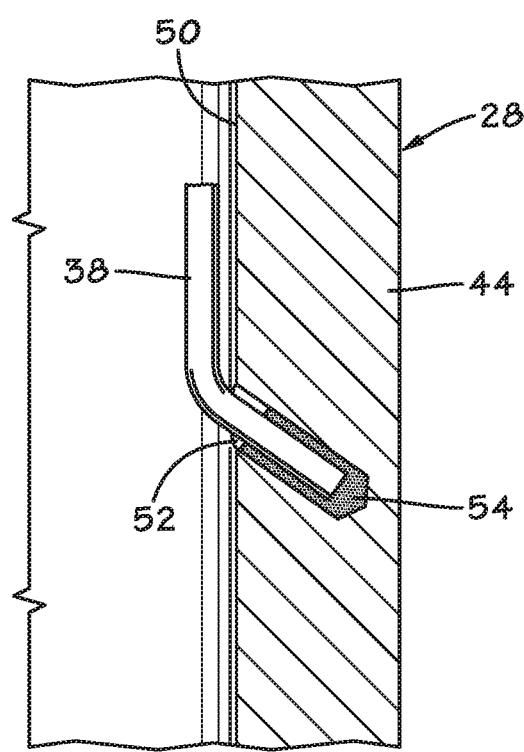
FIG. 4 is a detail view depicting termination of an exemplary optic fiber within the connector.

An exemplary connector 28 is illustrated in FIG. 3 apart from other components of the work string 22. In preferred embodiments, the connector 28 includes a housing 44 having axial ends 46 and 48 which are threaded for attachment of the bottom hole assembly 30 and the running string 24. It is noted that, while threading is depicted, the connector 28 might also be a dimple or roll-on style connector sub. The connector 28 defines a flowbore 50 along its length. The connector 28 also preferably includes a termination channel 52 for each optic fiber 38. Each optic fiber 38 is terminated within the connector 28 by disposing the distal end of the fiber 38 within a termination channel 52 which contains a gel 54 which is solidified to secure the end within. See FIG. 4. The electrical conductors 34 and insulation layer 36 extend through the connector 28 down to the bottom hole assembly 30.

Figure 5:
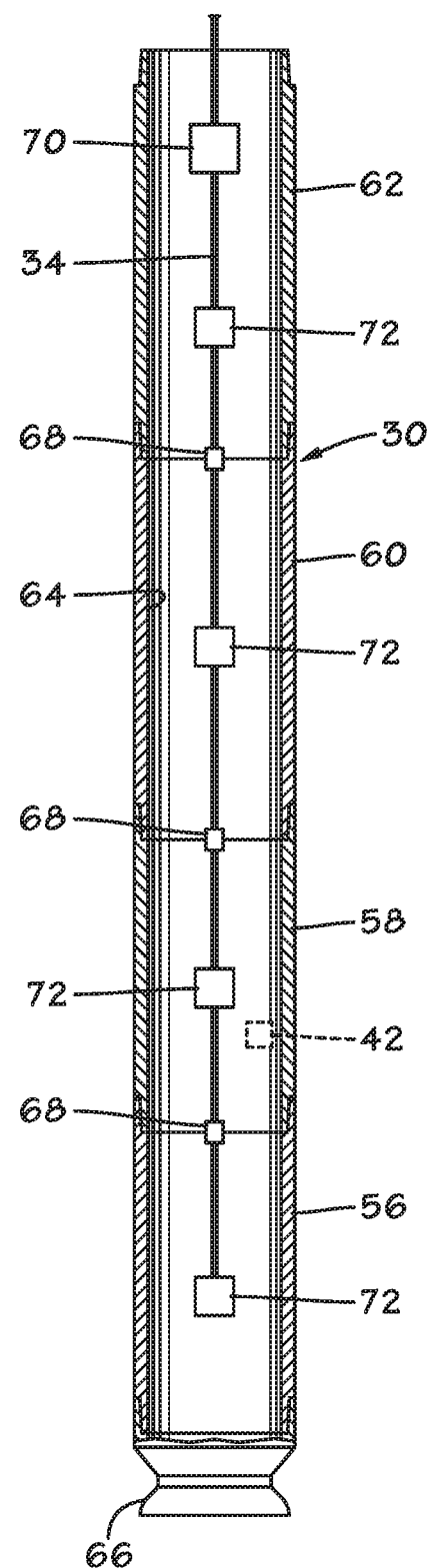
FIG. 5 is a side, cross-sectional view of an exemplary bottom hole assembly in accordance with the present invention.

In preferred embodiments, the bottom hole assembly 30 includes a bus system and electrical connectors which permit assembly of separate subs within the bottom hole assembly in a modular fashion. The bus is preferably a multiconductor line which has a ground, +24 VDC and +7.5 VDC are well as a two communication lines: signal A and signal B. The communication architecture may be based off of the RS-485 standard with a speed of 9600 bits/second. Subs may be interchanged or added to allow construction of a bottom hole assembly 30 having a desired mix of sensors and/or tools. FIG. 5 illustrates an exemplary bottom hole assembly 30 which is made up of a plurality of interconnected subs 56, 58, 60, 62 and which is useful for conducting a downhole coiled tubing operation. In the illustrated embodiment, the bottom hole assembly 30 is useful for conducting a coiled tubing fishing operation. However, it should be understood that this is by way of example only and that the bottom hole assembly 30 might be used to conduct any and all types of coiled tubing operations. A flow through passageway 64 is defined along the length of the bottom hole assembly 30. The electrical conductor(s) 34 extend along the length of the passageway 64 of the bottom hole assembly 30. Sub 56 includes a fishing tool 66 of a type known in the art for removal of a stuck tool or object within the wellbore 10. Sub 58 contains sensors 42 for detection of tool and annulus pressure as well as temperature. Sub 60 contains sensors for detection of gamma. The electrical conductor(s) 34 is/are preferably provided with detachable connection points 68 which allow the subs 56, 58, 60, 62 to be electrically interconnected in a reversible manner. The connection points 68 may comprise USB-type connectors or similar connectors which allow for transmission of power and data. The electrical conductor(s) 34 incorporate a modem 70 for transmission of data uphole to the controller 16. Individual sensor(s) 42 communicate with the modem 70 which packages the data provided from the sensor(s) 42 and transmits it uphole to the controller 16.

Each of the subs 56, 58, 60, 62 includes an electronics package, generally indicated at 72 which can include sensors, such as sensor(s) 42, as well as other wellbore electronics, such as those which drive or operate valve actuators or other actuators as well as a processor, logic controller or digitizer and data storage, if desired. Electronics packages for various sensor and tool functions may be implemented using printed circuit boards or other methods known in the art.

Modules in the form of additional sensor and/or tool subs may be added or interchanged with the subs 56, 58, 60, 62, as desired to provide a combination of desired functionality for the bottom hole assembly 30. For example, the sub 60 might be replaced by a sub having sensors for detection of tension, compression and torque. In this way, the bottom hole assembly 30 may be customized to have a desired mix of subs with a corresponding mix of functionality. When modules are disassembled from one another, the connection points 68 are disconnected and these are reassembled as modules are reassembled.

In operation, the work string 22 is injected into the wellbore 10 until the bottom hole assembly 30 is located at or near a location 56 within the wellbore 10 wherein it is desired to conduct a downhole operation. The downhole operation may include fishing for removal of a stuck tool or object (not shown), fracturing or acidizing, cleanout of a section of the wellbore or other well-known operations. As the downhole operation is conducted, the controller 16 receives data representative of a first downhole operating parameter (i.e., temperature, pressure, gamma) from the sensor(s) 42 at the location 56 via the electrical conductor(s) 34. Meanwhile, temperature and/or acoustic data is collected along the length of the flowbore 26 of the work string by the OTDR 20 from the optic fiber(s) 38.

What is claimed is:

1. A work string for conducting a downhole operation within a wellbore, the work string comprising:
    a running string which defines a flowbore;
    a bottom hole assembly having at least one electrically powered sensor or tool;
    a hybrid cable within the flowbore, the hybrid cable including at least one electrical conductor and at least one optic fiber, the electrical conductor including at least one detachable connection point within the bottom hole assembly;
    a connector which interconnects the bottom hole assembly with the coiled tubing running string;
    wherein the electrical conductor passes through the connector and is interconnected with the electrically powered sensor or tool within the bottom hole assembly; and
    the optic fiber terminates within the connector.

2. The work string of claim 1 wherein:
    the at least one electrical conductor transmits power from a surface-based power source to the electrically powered sensor or tool; and
    the at least one electrical conductor transmits data from the electrically powered sensor or tool to a surface-based controller.

3. The work string of claim 1 wherein:
    the at least one optic fiber is interconnected with an OTDR at surface; and
    the at least one optic fiber and OTDR are operated to conduct distributed temperature sensing or distributed acoustic sensing.

4. The work string of claim 1 wherein:
    the optic fiber is terminated within the connector by disposing a distal end of the optic fiber within a termination channel formed within the connector.

5. The work string of claim 1 wherein:
    the running string is a coiled tubing running string.

6. The work string of claim 1 wherein:
    the hybrid cable permits two-way data communication and two-way power through electrical conductors.

7. A telemetry system for a wellbore work string having running string and a bottom hole assembly which is secured to the running string by a connector, the system comprising:
    an optical sensing system which monitors a wellbore parameter along a length of the running string, the optical sensing system including an optic fiber which extends along a flowbore of the running string and which terminates within the connector;
    an electrical telemetry system which includes at least one sensor within the bottom hole assembly and an electrical conductor which transmits data from the sensor to a controller.

8. The telemetry system of claim 7 wherein:
    the electrical telemetry system includes at least one detachable connection point within the bottom hole assembly.

9. The telemetry system of claim 7 wherein the optic fiber and electrical conductor are combined within a hybrid cable which is disposed within the running string.

10. The telemetry system of claim 9 wherein:
    the hybrid cable permits two-way data communication and two-way power through electrical conductors.

11. The telemetry system of claim 7 wherein:
    the at least one sensor of the electrical telemetry system detects one or more of wellbore parameter from the group consisting of temperature, pressure, gamma, casing collar location, azimuth, tension, compression and torque.

12. The telemetry system of claim 7 wherein:
    the optical sensing system detects distributed temperature or distributed acoustic data along the flowbore.

13. A telemetry system for a wellbore work string having running string and a bottom hole assembly which is secured to the running string by a connector, the system comprising:
    an optical sensing system which monitors a wellbore parameter along a length of the running string, the optical sensing system including an optic fiber which extends along a flowbore of the running string and which terminates within the connector; and
    an electrical telemetry system which includes at least one sensor within the bottom hole assembly and an electrical conductor which permits two-way data communication between a controller and the bottom hole assembly.

14. The telemetry system of claim 13 wherein:
    the optical sensing system detects distributed temperature or distributed acoustic data along the flowbore.

15. The telemetry system of claim 13 wherein:
    the electrical telemetry system includes at least one detachable connection point within the bottom hole assembly.

16. The telemetry system of claim 13 wherein:
    the optic fiber and electrical conductor are combined within a hybrid cable which is disposed within the running string.

17. The telemetry system of claim 16 wherein:
    the electrical conductor is retained within an insulation layer; and
    the optic fiber lies radially outside of the insulation layer.

18. The telemetry system of claim 17 wherein:
    an outer metallic tubing radially surrounds the electrical conductor, insulation layer and optic fiber.

* * * * *